3,019,212
DIISOCYANATE-MODIFIED ACID-TREATED POLYETHERS

John A. Parker, Lancaster Township, Lancaster County, Pa., assignor to Armstrong Cork Company, Lancaster, Pa., a corporation of Pennsylvania
No Drawing. Filed Nov. 7, 1958, Ser. No. 772,409
5 Claims. (Cl. 260—75)

This invention relates generally to organic diisocyanate-modified polymers, and more particularly to organic diisocyanate-modified polyethers. Still more particularly the invention relates to the method, and the resulting product, of producing diisocyanate-modified polyethers in the form of gels having real, three-dimensional networks.

The invention contemplates as a starting material a polyalkylenether glycol, or more simply, a polyether, having the formula $$HO\text{-}(CH_2)_nO\text{-}_{n'}H$$

wherein $n$ is a number from 2–5 inclusive and $n'$ is a number sufficiently large to give the polyether a molecular weight in the range of about 400–4000. This polyether is treated with an alpha-beta ethylenically unsaturated compound having 4–5 carbon atoms selected from the group consisting of dicarboxylic acids and the anhydrides thereof. The amount of the unsaturated acid or anhydride to be used is in the range of about 0.04–0.4 mole of the unsaturated dicarboxylic acid or anhydride per mole of the polyether. The resulting product is an acid-modified polyether. The acid-modified polyether is then treated, at a temperature in the range of 80°–150° C. with an organic aromatic diisocyanate in an amount of about 0.5–1 equivalents of said diisocyanate per equivalent of said acid-modified polyether. The amount used within this range should be sufficient to at least form an incipient gel having a real, three-dimensional network.

The polyethers which are the starting material of the present invention are the polyalkylenether glycols, many of which can be formed by the condensation of suitable alkylene oxides. For example, ethylene oxide may be treated in known manner to form polyethylene glycols of various molecular weights. Propylene oxide may be used in the same manner. The alkylene group in the polyethers will contain 2–5 carbon atoms and will be linked to adjacent alkylene groups by means of an ether oxygen. It is not necessary that the alkylene groups in the polyether be identical for any given polyether. Thus the condensation product of a mixture of, for example, ethylene oxide and propylene oxide will be suitable.

The molecular weight of the polyethers should be in the range of about 400–4000 since it is this range which allows the production of diisocyanate-modified polyethers suitable for the purpose intended. The polyether chain may have pendant methyl, or even ethyl groups, so long as the polyether meets the definition stated above.

The fully formed polyether is to be reacted with an alpha-beta ethylenically unsaturated dicarboxylic acid or anhydride having 4–5 carbon atoms. The list of compounds covered by this definition is rather restrictive and consists of maleic acid and anhydride, fumaric acid, citraconic acid and anhydride, and itaconic acid and anhydride.

The amount of the unsaturated dicarboxylic acid or anhydride to be added to the polyether will always be in the range of about 0.04–0.4 mole of the dicarboxylic acid or anhydride per mole of the polyether. On a weight basis the amount of the dicarboxylic acid or anhydride will be comparatively small since the molecular weights of the dicarboxylic acids or anhydrides are small as compared with the molecular weights of the polyethers. Amounts of the dicarboxylic acids or anhydrides less than the 0.04 molar minimum are insufficient to allow the production of the gelled product, while amounts greater than the 0.4 molar amount will again fail to produce a gelled product. It is one of the surprising and unexpected features of the present invention that the amount of dicarboxylic acid or anhydride to be added to the polyether must fall within a certain critical range if the final diisocyanate-modified polyether is to have a real, three-dimensional network.

In all instances the result of the addition of the proper amount of the dicarboxylic acid or anhydride is the formation of an acid-modified, hydroxyl-terminated polyether. Depending on the reactivity of the polyether, the reaction between the polyether and the dicarboxylic acid or anhydride to form the acid-modified polyether may take place at room temperature. In most instances, however, it is desirable to hasten the reaction by warming or heating the reaction mixture. This reaction is not a polymeric esterification reaction; no true chain extension is involved. One acid group of the dicarboxylic acid or anhydride reacts with a hydroxyl group of the polyether, while the other acid group remains unreacted and in condition to react with the diisocyanate to be subsequently added. Thus the temperature of the reaction mixture should not be above about 115° C., and will generally run 20°–115° C., with 100° C. being the preferred elevated temperature. Where a dicarboxylic acid anhydride is used, no water will be formed. Where, however, the acid itself is used, water will be formed, and it is highly desirable to eliminate this water of condensation by heating, by sweeping it out with an inert gas, by subjecting the reaction mixture to a vacuum, or by a combination of two or more of these.

The procedure as described so far can be summarized by saying that the proper polyether is touched up by the addition thereto of relatively small amounts of ethylenically unsaturated dicarboxylic acids or anhydrides having 4–5 carbon atoms to form an acid-modified polyether.

The next step of the procedure calls for reacting the proper amount of an organic diisocyanate with the acid-modified polyether in order to form a gelled diisocyanate-modified polyether having a real, three-dimensional network. The first phase of this procedure involves the determination of the precise amount of organic diisocyanate to be added to the acid-modified polyether in order to form the gelled modified polyether.

The simplest method of determining the precise amount of organic diisocyanate to be used is an empirical one. A series of samples of the acid-modified polyether is withdrawn and placed in bottles, the samples all being of the same weight. To each sample there is added an increasing amount of the organic diisocyanate and the resulting mixture is heated as described later. One or more of the samples will gel, while the sample having the next lower amount of diisocyanate will remain fluid.

Thus the weight of the organic diisocyanate to be added to any given weight of the acid-modified polyether may readily be determined. This method is not as tedious as it might sound. If the acid-modified polyether has been prepared in accordance with the description given earlier, the incipient gel point will always occur when the organic diisocyanate is added in an amount in the range of about 0.5–1 equivalents of the diisocyanate per equivalent of the acid-modified polyether. This means that no more than five samples will be necessary and that to each sample will be added, respectively, that weight of organic diisocyanate which corresponds to 0.5, 0.6, 0.7, 0.8, and 0.9 equivalents of diisocyanate per acid-terminated polyether equivalent. The following relationship is useful in determining the minimum amount of organic diisocyanate to be added to any given acid-modified polyether to cause incipient gellation:

$$r_{(critical)} = \frac{[NCO]}{[HO+COOH]}$$

In the above formula, $r_{(critical)}$ is the ratio of organic diisocyanate equivalents to acid-modified polyether equivalents that will just change the liquid acid-modified polyether to a gelled solid; it will always be in the range of 0.5–1. The term [NCO] is the equivalent weight of the organic aromatic diisocyanate; in this reaction the equivalent weight of the organic diisocyanate is one-half the molecular weight. The term OH is the hydroxyl number of the acid-modified polyether, and the term COOH is the acid number of the acid-modified polyether. Knowing that $r_{(critical)}$ must always be in the range 0.5–1 to achieve a gel having a real, three-dimensional network, the amount of organic diisocyanate to be used in each of the samples is readily obtained.

Knowledge of the chemistry of these reactions allows use of an alternate and rather elegant method for determining the amount of dicarboxylic acid or anhydride to be added in conjunction with the amount of the organic aromatic diisocyanate. This alternate method allows the mere selection of the $r_{(critical)}$ value between the 0.5–1 limits described earlier. Thus one can pick any of the polyethers contemplated for use in the present invention, and select an $r_{(critical)}$ value guided by the considerations to be given below. Having the polyether, and having selected the desired $r_{(critical)}$ value, the amount by weight, $W_a$, of the dicarboxylic acid or anhydride to be added, and the amount by weight, $W_i$, of the aromatic organic diisocyanate to be added, may be readily calculated by the following two equations:

(1) $$W_a = \frac{W_p H_o E_a (1 - r_{(crit)})}{4 r_{(crit)} k}$$

(2) $$W_i = \frac{r_{(crit)} E_i W_p H_o}{k}$$

In the above two equations the following notations apply:

$W_p$ = the weight of polyether to be treated.
$H_o$ = the hydroxyl number of the initial polyether.
$E_a$ = the equivalent weight of the modifying dicarboxylic acid or anhydride, here equal to the molecular weight.
$r_{(crit)}$ = the selected value of $r_{(critical)}$.
$E_i$ = the equivalent weight of the organic aromatic diisocyanate, here equal to one-half the molecular weight.
$k$ = the milliequivalent weight of potassium hydroxide, namely, $5.61 \times 10^4$.

In selecting the $r_{(crit)}$ value within the limits earlier defined, the higher the hydroxyl number of the polyether, and the higher the selected $r_{(crit)}$ value, the greater will be the amount of diisocyanate to be added and the greater will be the gel content of the final product. This merely means that the higher the hydroxyl number and $r_{(crit)}$ value, the stiffer will be the resulting product. The smaller the selected $r_{(crit)}$ value, the greater will be the ratio of hydroxyl number:acid number of the acid-terminated polyether. The smaller this ratio, the easier it is to weigh out the precise amount of diisocyanate needed to form the incipient gel. The larger this ratio, the more difficult it is to accomplish the accuracy of weighing needed to add the exact amount of diisocyanate needed to accomplish incipient gellation, no more, no less. Also, the higher the ratio, the higher the gel content; the lower the ratio, the lower the gel content.

It must be emphasized that the point of incipient gellation—that point defined by the $r_{(crit)}$ value—is an easily recognized end point. As one adds the aromatic diisocyanate in amounts less than that defined by the $r_{(crit)}$ value, no change in the fluidity or other physical properties of the acid-terminated polyether can be detected. Even an amount of the diisocyanate of, say, 0.1% by weight less than that which will produce incipient gellation, leaves the acid-modified polyether in a liquid or fluid state. However, once the exact amount of diisocyanate defined by the $r_{(crit)}$ value has been added, dramatic changes occur. The liquid acid-modified polyether immediately stiffens and ceases its flow at room temperature. This extraordinarily noticeable change occurs even in those acid-modified polyethers in which the $r_{(crit)}$ value is such to produce a gel content on the order of only about 5% by weight of the total composition; very small gel contents nevertheless suffice to produce easily observable points of incipient gellation.

Once the point of incipient gellation—defined by the $r_{(crit)}$ value—has been reached, it is possible to continue adding aromatic organic diisocyanate up to the point where the $r$ value—not the $r_{(crit)}$ value—equals 1. The $r$ value is the ratio of diisocyanate equivalents to acid-modified polyether equivalents. As the additional diisocyanate is added, additional cross-links are established and the gel content in the composition grows ever larger. As a result the gel grows stiffer and stiffer. At the same time the product is completely stable since there are no unreacted isocyanate groups present in the molecule; all of them have participated in the cross-linking reaction. However, once the amount of diisocyanate reaches an $r$ value of 1, unreacted isocyanate groups are present and the polymer is therefore unstable. The present invention is not concerned with these unstable polymers.

Summarizing, the present invention allows the predictable production of polyurethanes. In one embodiment, a defined polyether is reacted with defined amounts of defined dicarboxylic acids or anhydrides, followed by the empirical determination of the amount of organic aromatic diisocyanate needed to produce incipient gellation. If desired, additional diisocyanate may be added up to a defined limit to produce tougher and stiffer products. In another embodiment of the invention, a defined polyether is characterized by assigning to it an $r_{(crit)}$ value, followed by the determination of the amount of the dicarboxylic acids or anhydrides to be added, along with a determination of the amount of the organic aromatic diisocyanate to be subsequently added. In both cases the invention contemplates the touching up of a defined polyether with defined carboxylic acids or anhydrides, followed by reaction of the resulting product with the proper amount of an organic aromatic diisocyanate.

The proper amount of the organic diisocyanate is thoroughly admixed with the acid-modified polyether. Completion of the reaction is then carried out by heating the mixture to a temperature in the range of 80°–150° C., usually 100°–125° C., until gellation is complete. Longer times will be required at lower temperatures, and the time will generally run from about 2 hours to about 15 hours. The final product at the elevated temperature will be thick and viscous in contrast to its fluid nature prior to the reaction with the organic diisocyanate. The heating may be carried out in any convenient manner. The mixture of acid-modified polyether and diisocyanate may be placed in suitable containers and then heated in the containers in an oven. Frequently it is desirable to mix the diisocyanate and the acid-modified polyether in a mixing device capable of being heated such as a Baker-Perkins mixer. The reaction between the diisocyanate and the acid-modified polyether may be carried out in part in such a mixer, and then the mixture may be discharged into suitable containers which are then placed in an oven for completion of the cure.

The final product obtained on cooling will be found to be a hard, tough, elastomer which is a gel having a real, three-dimensional network. If any dicarboxylic acids, saturated or unsaturated, are used which do not meet the definition stated earlier, then no gel will form at an $r$ value of less than one. Even at $r$ values greater than one no gel can possibly form wherein the gel possesses a real, three-dimensional network. Instead, a mechanical gel may form; these are pseudo gels which are readily soluble in chloroform. In the present specification and claims where the phrase "real, three-dimensional network" is used, it is intended to define the situation where the acid-modified polyether has been chain-extended to a maximum and at the same time cross-linking has occurred to produce the true gel.

The present invention results in part from the surprising and completely unexpected discovery that only the defined unsaturated dicarboxylic acids or anhydrides in the amounts used will produce a diisocyanate-modified polyether which is a true gel. If acid groups other than those defined earlier are used to terminate the polyether, then the acid groups react only slightly, if at all, up to $r$ values in excess of one. On the other hand where the terminating acid groups are those defined herein, the acid groups are consumed directly by each incremental addition of the organic diisocyanate. In the case of acid end groups other than those defined herein the equilibrium of the reaction between the diisocyanate and the acid-terminated polyether lies far to the left and requires a large excess of diisocyanate; an equilibrium exists with respect to the acid end groups until all of the hydroxyl groups have reacted with the organic diisocyanate. On the other hand, where the acid end groups are those as defined earlier, reaction takes place at those end groups immediately and not at a time subsequent to the disappearance of all the hydroxyl groups.

The invention is not critical as to the precise organic aromatic diisocyanate to be used. The preferred diisocyanate at this time is 2,4-toluene diisocyanate, but this preference is primarily based on cost. Additional diisocyanates which may be used are 4,4'-diphenyl diisocyanate, 4,4'-diphenylene methane diisocyanate, dianisidene diisocyanate, 4,4'-tolidene diisocyanate, the various naphthalene diisocyanates, and m-phenylene diisocyanate. Choice of different polyethers and different diisocyanates will produce true gels according to the present invention which will have different properties among themselves. Hence it is possible to make a choice among a wide variety of tough elastomers depending on the particular use to which the end product is to be put.

The diisocyanate-modified polyethers of the present invention are useful in modifying the properties of vinyl chloride resins such as polyvinyl chloride and vinyl chloride-vinyl acetate copolymers. The diisocyanate-modified polyethers may be admixed with conventional plasticizers and with the vinyl chloride resins and may then be used to form films which are tough, strong, and stable and which are suitable for forming the outer surface of such surface covering materials as wall coverings, floor coverings, desk tops, counter tops, and the like. The films may be colored with suitable pigments and dyes to present an attractive appearance to the eye. The films may be embossed and colored to simulate leather which can then be used as a covering for articles of furniture such as chairs and the like. The vinyl chloride resin-modified polyether mixture may also be utilized as a binder in the formation of plastic floor and wall coverings wherein conventional fillers and coloring materials are incorporated into the mixture. The final mixture may be calendered or otherwise deposited onto a suitable backing such as felt sheets, asbestos sheets, burlap, or the like in order to form tough, strong floor and wall coverings.

The following examples illustrate several embodiments of the invention. All parts are by weight unless otherwise stated.

*Example 1*

Six samples were taken weighing 1000 parts each of a polyethylene glycol having a molecular weight of 600 (polyethylene glycol 600). To each sample was added a specified amount of maleic anhydride. After mixing, esterification between the polyether and the anhydride was carried out through simple ring opening of the anhydride by heating for a few minutes at 100° C. The samples were cooled and the hydroxyl number and the acid number of each was determined.

All of the acid-modified polyether samples were maintained at 125° C. and incremental amounts of 2,4-toluene diisocyanate were added and allowed to react until the incipient gel point was reached. Following are the data:

| Sample Number | Parts Maleic Anhydride Added | Hydroxyl Number | Acid Number | Gel Point $r_{(crit)}$ |
|---|---|---|---|---|
| 2 | 8.81 | 173.4 | 5.63 | 0.97 |
| 3 | 17.78 | 176.8 | 10.73 | 0.86 |
| 4 | 26.91 | 168.5 | 15.51 | 0.84 |
| 5 | 37.0 | 165.7 | 21.84 | 0.83 |
| 6 | 46.6 | 160.7 | 26.05 | 0.81 |
| 7 | 56.5 | 156.0 | 30.81 | 0.80 |

The above-described samples were re-run using the following acids in lieu of maleic anhydride: hexahydrophthalic acid, succinic acid, tetrahydrophthalic acid. No gels were obtained at $r$ values of less than one, and at $r$ greater than one, only mechanical gels were obtained.

*Example 2*

In order to hold the hydroxyl number approximately constant, a series of samples was run wherein 1000 parts of polyethylene glycol having a molecular weight of 1540 (polyethylene glycol 1540) was used with varying amounts of maleic anhydride; the hydroxyl number was held approximately constant by the addition thereto of varying amounts of a polyethylene glycol having a molecular weight of 600 (polyethylene glycol 600). The runs were made as in Example 1. Following are the data:

| Sample Number | Parts Maleic Anhydride Added | Parts Polyethylene Glycol 600 Added | Hydroxyl Number | Acid Number | Gel Point $r_{(crit)}$ |
|---|---|---|---|---|---|
| 1 | 0 | 0 | 89.6 | 0 | 1.05 (mechanical gel). |
| 2 | 8.81 | 0 | 82.3 | 5.26 | 0.88. |
| 3 | 18.90 | 50 | 84.9 | 10.58 | 0.73. |
| 4 | 29.85 | 99.8 | 83.7 | 15.13 | 0.70. |
| 5 | 41.62 | 149.7 | 77.8 | 20.52 | 0.73. |
| 6 | 69.10 | 249.5 | 88.4 | 31.72 | 0.65. |

A comparison of sample number 2 in Example 2 with sample number 2 of Example 1 illustrates that the higher the molecular weight of the parent polyether chain, that is, the lower the hydroxyl number, the more effective is the alpha-beta unsaturated dicarboxylic acid end group as defined herein in producing the onset of gellation.

*Example 3*

Example 2 was repeated using a polyethylene glycol having a molecular weight of 4000 (polyethylene glycol 4000). The hydroxyl number was held substantially constant by the addition thereto of polyethylene glycol 1540. Following are the data:

| Sample Number | Parts Maleic Anhydride Added | Parts Polyethylene Glycol 1540 Added | Hydroxyl Number | Acid Number | Gel Point $r_{(crit)}$ |
|---|---|---|---|---|---|
| 2 | 4.39 | 0 | 37.0 | 2.67 | 0.83 |
| 3 | 8.83 | 0 | 34.1 | 5.35 | 0.63 |
| 4 | 19.79 | 111.1 | 34.0 | 10.95 | 0.53 |
| 5 | 33.70 | 250 | 33.9 | 16.08 | 0.59 |
| 6 | 51.81 | 428.5 | 35.0 | 20.97 | 0.58 |
| 7 | 76.25 | 666.7 | 34.7 | 24.67 | 0.58 |
| 8 | 110.82 | 1,000 | 34.1 | 30.6 | 0.58 |

Sample number 3 in Example 3 as compared with sample number 2 of Example 2 and sample number 2 of Example 1 further illustrates that the maleic acid end group has a greater effect the lower the hydroxyl number.

*Example 4*

Example 1 was repeated using 1000 parts of a polybutylene glycol having a molecular weight of 3000. Following are the data:

| Sample Number | Parts Maleic Anhydride Added | Hydroxyl Number | Acid Number | Gel Point $r_{(crit)}$ |
|---|---|---|---|---|
| 33 | 0 | 39.7 | 0 | 1.06 (mechanical gel). |
| 34 | 8.81 | 34.2 | 5.06 | 0.90. |
| 35 | 17.85 | 39.0 | 9.90 | 0.90. |
| 36 | 27.13 | 41.5 | 14.61 | 0.90. |
| 37 | 36.65 | 41.1 | 19.79 | 0.90. |
| 38 | 46.42 | 43.4 | 24.94 | 0.85. |

*Example 5*

To 1000 parts of polyethylene glycol having a molecular weight of 1540 was added 9.6 parts of citraconic anhydride, and the mixture was heated at 90° C. for a few minutes. The resulting acid-modified polyether had a hydroxyl number of 83.6 and an acid number of 4.8. The $r_{(crit)}$ value was 0.88 as determined by testing a series of samples. The weight, $W_i$, of m-phenylene diisocyanate needed was determined by the equation $$W_i = \frac{r \times E_i \times W_p \times H_o}{56.1 \times 10^3}$$

wherein $r$ has meaning described earlier, $E_i$ is the equivalent weight of the diisocyanate, $W_p$ is the weight of the original polyether, and $H_o$ is the hydroxyl number of the original polyether. Accordingly, 111 parts of m-phenylene diisocyanate was added to acid-terminated polyether, and the mixture was heated at 110° C. for 12 hours. A tough elastomer resulted; the elastomer was a true gel having a real, three-dimensional network.

I claim:
1. In the method of making an organic diisocyanate-modified polyether by forming a polyether and reacting said polyether with an organic diisocyanate, the improved method of making a gelled product having a real, three-dimensional network which comprises adding to a polyether having the formula

$$HO\text{-}[(CH_2)_nO]_{n'}\text{-}H$$

wherein $n$ is a number from 2–5 inclusive and $n'$ is a number sufficiently large to give the polyether a molecular weight in the range of about 400–4000, an alpha-beta ethylenically unsaturated compound having 4–5 carbon atoms selected from the group consisting of maleic acid, fumaric acid, citraconic acid, itaconic acid, and anhydrides thereof in an amount of 0.04–0.4 mole of said compound per mole of said polyether, maintaining the mixture of said compound and said polyether at a temperature in the range of 20°–115° C. to cause a carboxyl group on said compound to react with a hydroxyl group on said polyether and form a carboxylic-acid-terminated polyether, and subsequently adding to the resulting acid-modified polyether at a temperature in the range of 80°–150° C. an organic aromatic diisocyanate in an amount of 0.5–1 equivalent per equivalent of said acid-modified polyether at least sufficient to form a gel having a real, three-dimensional network.

2. The method according to claim 1 wherein said $n$ equals the number 2.

3. The method according to claim 1 wherein said compound comprises maleic anhydride.

4. The method according to claim 1 wherein said organic diisocyanate comprises 2,4-toluene diisocyanate.

5. The product of the method of claim 1.

References Cited in the file of this patent

UNITED STATES PATENTS

| 2,760,953 | Seeger | Aug. 28, 1956 |
| 2,850,424 | Finelli et al. | Sept. 2, 1958 |
| 2,868,739 | Nischk et al. | Jan. 13, 1959 |
| 2,888,437 | Finelli et al. | May 26, 1959 |

FOREIGN PATENTS

| 773,991 | Great Britain | May 1, 1957 |